(12) United States Patent
Luedemann

(10) Patent No.: US 9,981,440 B2
(45) Date of Patent: May 29, 2018

(54) ROTOR FOR A ROTARY PRESS

(71) Applicant: Fette Compacting GmbH, Schwarzenbek (DE)

(72) Inventor: Stefan Luedemann, Hamburg (DE)

(73) Assignee: Fette Compacting GmbH, Schwarzenbek (DE)

( * ) Notice: Subject to any disclaimer, the term of this patent is extended or adjusted under 35 U.S.C. 154(b) by 104 days.

(21) Appl. No.: 15/099,806

(22) Filed: Apr. 15, 2016

(65) Prior Publication Data

US 2016/0303816 A1    Oct. 20, 2016

(30) Foreign Application Priority Data

Apr. 17, 2015  (DE) .................. 10 2015 105 936

(51) Int. Cl.
| | | |
|---|---|---|
| *B30B 11/08* | (2006.01) | |
| *B29C 43/08* | (2006.01) | |
| *B30B 15/00* | (2006.01) | |
| *B29C 43/04* | (2006.01) | |
| *B29C 43/32* | (2006.01) | |

(Continued)

(52) U.S. Cl.
CPC .......... *B30B 15/0011* (2013.01); *B29C 43/04* (2013.01); *B29C 43/32* (2013.01); *B29C 43/34* (2013.01); *B29C 43/50* (2013.01); *B29C 43/58* (2013.01); *B30B 11/08* (2013.01); *B30B 15/0088* (2013.01); *B29C 43/08* (2013.01); *B29C 2037/92* (2013.01); *B29C 2043/046* (2013.01); *B29C 2043/3288* (2013.01); *B29C 2043/5808* (2013.01)

(58) Field of Classification Search
CPC . B30B 11/08; B30B 15/0011; B30B 15/0088; B29C 43/08; B29C 43/32; B29C 2043/3288; B29C 2037/92; A61J 3/10
See application file for complete search history.

(56) References Cited

U.S. PATENT DOCUMENTS

| | | | | |
|---|---|---|---|---|
| 1,448,982 A | * | 3/1923 | Treadwell | B30B 11/08 |
| | | | | 425/231 |
| 3,392,688 A | * | 7/1968 | Korsch | B30B 11/08 |
| | | | | 425/107 |

(Continued)

FOREIGN PATENT DOCUMENTS

| | | |
|---|---|---|
| DE | 1241593 | 6/1967 |
| DE | 8910771 | 11/1989 |

(Continued)

OTHER PUBLICATIONS

Japanese Patent Application No. 2016-0823661, filed Apr. 17, 2015; Office Action dated Aug. 24, 2017; 8 pages.

*Primary Examiner* — James P Mackey
(74) *Attorney, Agent, or Firm* — Barclay Damon LLP

(57) ABSTRACT

A rotor for a rotary press comprising a die plate having die bores and upper punches and lower punches assigned in pairs to the die bores, circulating synchronously with the die plate An upper punch receiver is configured to axially guide the upper punches and a lower punch receiver is configured to axially guide the lower punches. An upper control cam is configured to control the axial movement of the upper punches passing through the upper control cam and a lower control cam is configured to control the axial movement of the lower punches passing through the lower control cam.

14 Claims, 1 Drawing Sheet

(51) Int. Cl.
    *B29C 43/34*     (2006.01)
    *B29C 43/50*     (2006.01)
    *B29C 43/58*     (2006.01)
    B29C 37/00     (2006.01)

(56) References Cited

U.S. PATENT DOCUMENTS

| | | |
|---|---|---|
| 4,047,866 A | 9/1977 | Shah |
| 2003/0031744 A1 * | 2/2003 | Cecil ................ B30B 11/08 425/107 |

FOREIGN PATENT DOCUMENTS

| | | |
|---|---|---|
| DE | 10113586 | 9/2002 |
| DE | 102013002267 | 8/2014 |
| JP | S61-182699 | 11/1986 |
| JP | H01-153895 | 10/1989 |
| JP | H06-297199 | 10/1994 |
| JP | H09-225-695 | 9/1997 |

* cited by examiner

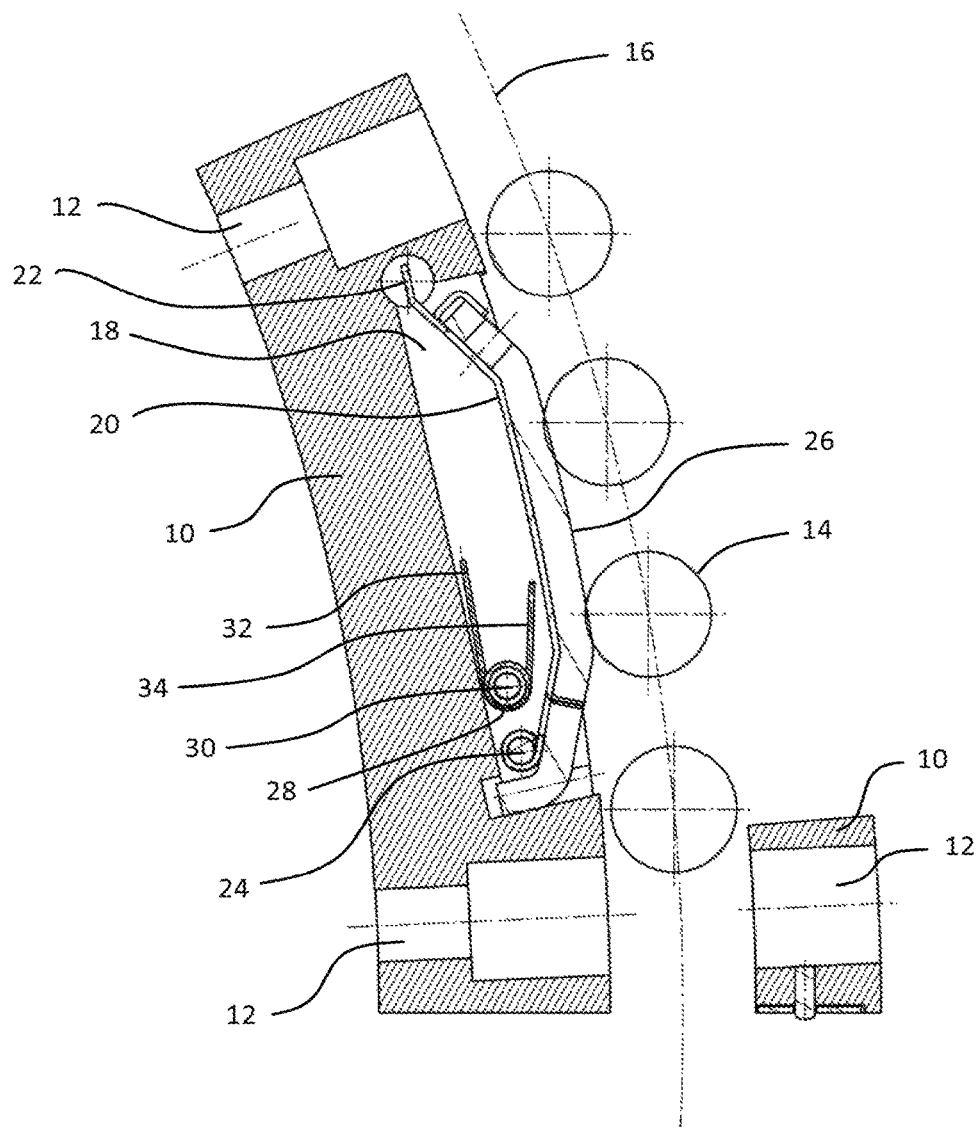

ROTOR FOR A ROTARY PRESS

CROSS REFERENCE TO RELATED APPLICATION

This application is based upon and claims priority under relevant sections of 35 U.S.C. § 119 to German Patent Application No. 10 2015 105 936.3, filed Apr. 17, 2015, the entire contents of which are hereby incorporated by reference.

BACKGROUND OF THE INVENTION

The upper and lower punches of the rotors of rotary presses have to be lubricated with a suitable lubricant, for example a lubricating oil. This generally takes place via a contact part which is in contact with the region of the upper or respectively lower punches to be lubricated. The contact part may consist, for example, of a felt which is soaked in the lubricant. It is known to arrange the contact part used for the lubrication in the region of a control cam portion of the upper or respectively lower control cam of the rotor. For effective lubrication, the position of the contact part relative to the upper or respectively lower punches passing through the contact part is crucial. This position relative to the upper or respectively lower punches is defined, in particular, by the geometry of the components used. For example, the geometry of the contact part, of the contact part holder holding the contact part, of the portion of the control cam, of the control cam support, of the rotor and the upper or respectively lower punches may be cited here. It is also known to adjust manually the position of the contact part before initial start-up, so that after the initial assembly a defined position of the contact part is present. This is associated with a not inconsiderable cost.

Wear of the contact part also results during operation. As a result, contact between the contact part and the upper or respectively lower punches passing through becomes increasingly impaired. Accordingly, the transmission of lubricant to the upper and lower punches is also only inadequate. In an extreme case, it may arise that between the contact part and the upper or respectively lower punches there is no longer any contact at all and the lubricating function is accordingly no longer ensured at all. Due to the tolerances of the components used, moreover, the contact pressure of the contact part on the upper or respectively lower punches may also vary significantly irrespective of the degree of wear. This also leads to an impaired lubricating function. The contact pressure may be too little or even too great. Too little contact pressure leads to impaired transmission of lubricant onto the upper or respectively lower punches. Too great a contact pressure leads to significant wear of the contact part or may even cause damage to the contact part. In practice, in the case of high pressure this also partially results in a release of the contact part from its holder.

BRIEF SUMMARY OF THE INVENTION

The object of the current invention is to provide a rotor and a rotary press of the type mentioned in the introduction, in which at any time a transmission of lubricant which is as uniform as possible to the upper or respectively lower punches is present. Excessive wear or damage to the components involved in the lubrication is intended to be avoided, in addition to damage resulting from too little lubrication In one embodiment, at least one portion of the upper control cam has at least one upper contact part in contact with the upper punches passing through and applying lubricant to the upper punches. At least one upper adjusting element is provided which adjusts the position of the at least one upper contact part by altering the distance from the upper punches passing through, such that the at least one upper contact part is always pressed with substantially the same contact force onto the upper punches passing through, and/or in that at least one portion of the lower control cam has at least one lower contact part in contact with the lower punches passing through and applying lubricant to the lower punches In an embodiment, at least one lower adjusting element is provided which adjusts the position of the at least one lower contact part by altering the distance from the lower punches passing through, such that the at least one lower contact part is always pressed with substantially the same contact force onto the lower punches passing through.

In another embodiment, a rotor for a rotary press comprises a die plate having die bores and upper punches and lower punches assigned in pairs to the die bores and circulating synchronously with the die plate further. In an embodiment, the rotor comprises an upper punch receiver in which the upper punches are axially guided as well as a lower punch receiver in which the lower punches are axially guided, In an embodiment, an upper control cam is provided which controls the axial movement of the upper punches passing through the upper control cam, as well as a lower control cam which controls the axial movement of the lower punches passing through the lower control cam.

In another embodiment, the invention further relates to a rotary press. The basic structure of a rotary press is known and therefore is not intended to be described in detail. The upper and lower punches of the rotor of the rotary press are guided in the axial direction in upper punch receivers or r lower punch receivers respectively. The axial movement of the upper or lower punches is controlled by upper and lower control cams. The upper and lower control cams are generally constructed from a plurality of control cam elements which are fastened to an upper or respectively to a lower control cam support. They form a receiver in which the upper or lower punches are held with their punch heads. The receiver forms an endless curved path which the upper or lower punches follow during the course of their rotation with the rotor, and thus are moved in a controlled manner in the axial direction. In particular, the upper and lower punches are moved in an appropriate axial manner for the filling and metering processes, the pressing process and the ejection process.

As explained above, it is necessary to lubricate the upper and lower punches. Some examples of lubricants that may be used are lubricating oils, lubricating greases, solid lubricants, or any other lubricant appropriate for lubricating the upper and lower punches. Furthermore, lubrication of the punch shafts axially guided in the upper or lower punch receivers of the upper or lower punches is required. In addition, the punch heads guided in the control cams generally have to be lubricated as well. At least one portion of the upper and/or lower control cam is used for the lubrication of the upper and lower punches, wherein the upper and/or lower punches when passing through this portion come into contact with an upper and/or lower contact part, which during the course of this contact applies the lubricant to the contact region of the upper and/or lower punches.

In an embodiment, an upper adjusting element and/or a lower adjusting element is provided The adjusting elements adjust the position of the at least one upper and/or lower contact part by altering the distance of the upper and/or lower contact part from the upper and/or lower punches passing through the respective control cam portion used for the lubrication, such that the at least one upper and/or lower contact part is always pressed with substantially the same contact force against the upper and/or lower punches passing through. The upper or lower adjusting element always ensures a substantially uniform distance between the upper or \lower contact part and the upper or lower punches moving past the contact part. The adjusting of the upper or \lower adjusting element according to the invention in this case may take place automatically. Generally, the adjusting of the upper or lower contact part in this case takes place in the direction of the upper or lower punches passing through when wear of the upper or lower contact part has led to an increased distance from the upper or lower punches. However, an adjustment away from the upper or lower punches is also possible, such as in the case of corresponding component tolerances.

In an embodiment, the contact parts are positioned by aligning with the upper or lower punches. Therefore, the position of the contact parts is not solely defined by the components used or by the initial adjustment during the initial assembly. Instead, by means of the upper or lower adjusting element, the contact part holder is configured such that the position of the upper or respectively lower contact part is automatically adjusted in a suitable manner.

The invention achieves a series of advantages and results in a constant transmission of lubricant to the upper or lower punches by the contact pressure of the contact part remaining the same. This in turn leads to a lower degree of wear of the upper or lower punches by ensuring sufficient lubrication at all times. As a result, it also leads to a lower degree of wear of the control cams and further elements of the rotary press, for example the pressing rollers of the pressing stations.

Damage to the upper or lower punches by insufficient contact with the contact part providing the lubrication is avoided as is damage which may arise due to damage to the upper and lower punches. The required lubricant quantity is able to be adjusted more easily for the operator as a constant transmission of lubricant takes place resulting in a more efficient use of lubricant and less excess lubricant. Excess lubricant is particularly critical as it may lead to contamination of the pressed articles produced. The handling of the components involved in the lubrication is simplified and less susceptible to error. A complex manual adjustment by an operator is not required. This also applies, in principle, to the initial assembly. Incorrect settings are reliably avoided and longer intervals between maintenance for the contact part results.

In an embodiment, an upper and a lower contact part and an adjusting element according to the invention are provided. The advantages of the lubrication according to the invention apply both to the upper punches and to the lower punches. However, it is also possible that the lubrication according is used only in the upper punches or only in the lower punches, thus only one upper contact part and adjusting element or only one lower contact part and adjusting element are provided.

In an embodiment, the at least one upper contact part may be in contact with the punch shafts of the upper punches. Accordingly, the at least one lower contact part may be in contact with the punch shafts of the lower punches. As already explained, in particular, the punch shafts of the upper or lower punches have to be sufficiently lubricated. To this end, the contact parts in this embodiment come into contact with the punch shafts.

In an embodiment, the at least one upper contact part is in contact with the punch heads of the upper punches, in particular the reflecting surfaces of the punch heads and/or the cylinder surfaces of the punch heads and/or the transition regions between the cylinder surfaces and the punch shafts of the upper punches and/or that the at least one lower contact part is in contact with the punch heads of the lower punches, in particular the reflecting surfaces of the punch heads and/or the cylinder surfaces of the punch heads and/or transition regions between the cylinder surfaces and the punch shafts of the lower punches. As also explained above, at least a portion of the punch heads of the upper or respectively lower punches also have to be lubricated frequently. Accordingly, the contact parts in this embodiment come into contact with the corresponding portions of the punch heads. In the press punches discussed here, the flat upper face of the punch heads located distally from the pressing region sunk into the bores of the die plate is denoted as the reflecting surface. The reflecting surface may be planar and may be of circular configuration in plan view. It may also comprise a curved transition region with the adjacent cylinder surface of the respective punch head. Moreover, in the punch heads, a conically configured or curved transition region is generally present between the cylinder surface and the respective punch shaft. Depending on the application, it may be expedient to lubricate a few regions or all regions of the punch head.

According to a further embodiment, at least one portion of the upper control cam comprises a plurality of upper contact parts in contact with the upper punches passing through in different regions and applying lubricant to the different regions of the upper punches and/or that at least one portion of the lower control cam comprises a plurality of lower contact parts in contact with the lower punches passing through in different regions and applying lubricant onto the different regions of the lower punches. By means of a plurality of contact parts, for example, the punch shafts and specific regions of the punch heads may be brought into contact and lubricated at the same time. An upper adjusting element may thus be provided for each upper contact part. The upper adjusting element adjusting the position of the at least one upper contact part by altering the distance from the upper punches passing through, such that the at least one upper contact part is always pressed with substantially the same contact force against the upper punches passing through. Accordingly, a lower adjusting element may be provided for each lower contact part. The lower adjusting element is configured to adjust the position of the at least one lower contact part by altering the distance from the lower punches passing through, such that the at least one lower contact part is always pressed with substantially the same contact force against the lower punches passing through.

In an embodiment, the at least one upper adjusting element may be formed by at least one upper spring element acting on the at least one upper contact part. Accordingly, the at least one lower adjusting element may be formed by at least one lower spring element acting on the at least one lower contact part. The spring element may comprise a spiral spring and may consist, for example, of metal, or in particular steel. The position of the respective contact part or respectively a contact holder respectively holding the contact part is aligned in a particularly simple manner with the upper or lower punches passing through. With a resilient contact part holder the upper or respectively lower punches to be lubricated form a stop against which the respective spring element presses. In an embodiment, a small spring path results in a contact force of the contact part defined via the spring characteristic curve that is virtually constant on the upper or lower punches passing through. The respective spring element may accordingly have a flat spring characteristic curve, wherein the spring characteristic curve is virtually constant in the small spring paths. The tolerances of the components used or the wear of the respective contact part thus have no effect on the function of the transmission of lubricant. An adjustment of the position of the contact part is also dispensed with.

In an embodiment, it is also possible that the at least one upper contact part and the at least one upper adjusting element are configured such that, during operation of the rotor. at least one upper punch is always brought into contact by the upper contact part and/or that the at least one lower contact part and the at least one lower adjusting element are configured such that, during operation of the rotor. at least one lower punch is always brought into contact by the lower contact part. By means of this embodiment, it is reliably avoided that the upper or respectively lower contact part or respectively contact part holder swing out and the same contact force of the contact part on the upper or respectively lower punches is always particularly reliably ensured.

According to a further embodiment, it may be provided that the at least one upper adjusting element comprises at least one upper adjusting drive acting on the at least one upper contact part and/or that the at least one lower adjusting element comprises at least one lower adjusting drive acting on the at least one lower contact part.

In an embodiment, the at least one upper adjusting drive may be at least one upper pneumatic drive, in particular a pneumatic cylinder drive. Accordingly, the at least one lower adjusting drive may be at least one lower pneumatic drive, in particular, a pneumatic cylinder drive.

In an embodiment, it is possible that the at least one upper adjusting drive is at least one electrical upper adjusting drive and/or that the at least one lower adjusting drive is at least one electrical lower adjusting drive.

In the aforementioned embodiments, the constant contact force of the contact part is defined by an active element, namely the adjusting drive. Moreover, an appropriate control device is provided which activates the adjusting drive in a suitable manner so that the contact force of the respective contact part on the upper or lower punches passing through is substantially constant. Moreover, measuring devices, which measure the distance and/or the contact force of the contact part relative to or respectively on the upper or respectively lower punches passing through, may also be provided. The measurement results may then be supplied to the control device which optionally activates in an appropriate manner the respective adjusting drive. In addition to the aforementioned adjusting drives, other drives may also be conceivable such as hydraulic drives.

According to a further embodiment, the at least one upper contact part and/or the at least one lower contact part (in each case) comprise at least one contact portion soaked in lubricant, for example made of felt or a similar absorbent material.

Another aspect of the invention relates to a rotary press comprising a rotor, a drive for the rotational driving of the rotor as well as at least one filling station comprising at least one filling device for filling the bores with material to be compressed. At least one pressing station comprising at least one pressing device which presses the upper and/or lower punches into the bores when passing through the pressing station in order to compress the material filled into the bores is disposed downstream of the filling station in the rotational direction of the rotor. At least one ejection station comprising an ejection device for ejecting the tablets pressed in the bores is disposed downstream of the pressing station in the rotational direction of the rotor.

BRIEF DESCRIPTION OF THE DRAWING

An exemplary embodiment of the invention is described in more detail hereinafter with reference to a FIGURE.

FIG. 1 is a horizontal section through a portion of a control cam of a rotor according to the invention of a rotary press.

DETAILED DESCRIPTION OF THE INVENTION

The rotor shown in the FIG. 1 comprises a die plate, not shown in the sectional view, including die bores and upper punches 14 and lower punches assigned in pairs to the die bores and circulating synchronously with the die plate. The rotor further comprises an upper punch receiver (not shown) in which the upper punches 14 are axially guided as well as a lower punch receiver (not shown) in which the lower punches are axially guided. The rotor comprises an upper control cam which controls the axial movement of the upper punches 14 passing through the upper control cam, as well as a lower control cam (not shown) which controls the axial movement of the lower punches passing through the lower control cam. The rotor is part of a rotary press which further comprises a drive for the rotational driving of the rotor as well as at least one filling station comprising at least one filling device for filling the bores with material to be compressed. At least one pressing station comprising at least one pressing device which presses the upper and/or lower punches into the bores when passing through the pressing station, in order to compress the material filled into the bores is located downstream of the filling station in the rotational direction of the rotor. At least one ejection station comprising an ejection device for ejecting the tablets pressed in the bores is located downstream of the pressing station in the rotational direction of the rotor. This basic construction of a rotor or respectively a rotary press is known per se and, therefore, is not intended to be described in more detail.

In the FIG. 1, a horizontal section is shown through a portion 10 of the upper control cam of the rotor according to the invention. Although the invention is explained hereinafter using an upper control cam for lubricating the upper punches of the rotary press, naturally a corresponding embodiment may be provided on the lower control cam for lubricating the lower punches which in this respect may be, in particular, of identical configuration.

Moreover, the invention is described hereinafter with reference to a lubrication of the punch shafts of the upper punches. Once again it is clear that a lubrication of the punch heads of the upper or respectively lower punches may also take place in the same manner.

The portion 10 of the upper control cam shown in FIG. 1 is fastened via connecting means 12, shown only exceptionally schematically on the upper cam support of the rotor. The upper punches which are guided along a pitch circle 16 by the upper control cam may be seen at the reference numeral 14. The portion 10 of the upper control cam in its region facing the upper punches 14 passing through has a recess 18. A contact part holder 20 consisting, for example, of a metal material is fastened with its opposing ends 22 and 24 in the recess 18. The contact part holder 20 bears an upper contact part 26 soaked with a lubricant, for example a lubricating oil. The contact part 26 consists of an absorbent deformable material, such as f felt, and faces the punch shafts of the upper punches 14 moving past the contact part 26 along the pitch circle 16. As a result, the punch shafts of the upper punches 14 are supplied with lubricant by the upper contact part 26.

A metal spring 28 is wound in a spiral-shaped manner around a cylindrical projection arranged fixedly in the recess 18, one free end 32 thereof bearing against the bottom face of the recess 18 remote from the upper punches 14 and the other free end 34 thereof under pretensioning bearing against the inner face of the contact part holder 20 remote from the upper contact part 26. The metal spring 28 forms an adjusting element according to the invention. The metal spring 28 exerts a contact pressure on the contact part holder 20 which in turn also leads to the upper contact part 26, in the presence of component tolerances or wear of the upper contact part 26, always being pressed with substantially constant contact force against the upper punches 14 passing through. Thus at any time and irrespective of wear or component tolerances, a constant and reliable supply of lubricant is ensured to the upper punches.

As an alternative to the passive adjusting element in the form of the metal spring 28, an active adjusting element comprising an adjusting drive, for example an electrical or pneumatic adjusting drive, may be used.

The invention claimed is:

1. A rotor for a rotary press comprising:
a die plate having die bores and upper punches and lower punches assigned in pairs to the die bores, the upper and lower punches configured to circulate synchronously with the die plate;
an upper punch receiver configured to guide the upper punches;
a lower punch receiver configured to guide the lower punches;
an upper control cam configured to control axial movement of the upper punches passing through the upper control cam;
a lower control cam configured to control axial movement of the lower punches passing through the lower control cam;
at least one upper contact part in contact with at least a portion of the upper punches passing through;
at least one lower contact part in contact with at least a portion of the lower punches passing through;
at least one upper adjusting element configured to adjust a position of the at least one upper contact part by altering a distance from the upper punches passing through, wherein the at least one upper contact part is always pressed with a substantially constant force onto the upper punches passing through; and
at least one lower adjusting element configured to adjust a position of the at least one lower contact part by altering a distance from the lower punches passing through, wherein the at least one lower contact part is always pressed with a substantially constant force against the lower punches passing through.

2. The rotor according to claim 1, wherein the at least one upper contact part is in contact with punch shafts of the upper punches.

3. The rotor according to claim 1, wherein the at least one lower contact part is in contact with punch shafts of the lower punches.

4. The rotor according claim 1, wherein the at least one upper contact part is in contact with punch heads of the upper punches.

5. The rotor according to claim 1, wherein at least one lower contact part is in contact with punch heads of the lower punches.

6. The rotor according to claim 1, wherein at least a portion of the upper control cam comprises a plurality of upper contact parts in contact with a portion of the upper punches passing through in different regions and configured to apply lubricant onto the different regions.

7. The rotor according to claim 1, wherein at least a portion of the lower control cam comprises a plurality of lower contact parts in contact with the lower punches passing through in different regions and configured to apply lubricant onto the different regions.

8. The rotor according to claim 1, wherein at least one of the at least one upper adjusting element and the at least one lower adjusting element is formed by at least one spring element.

9. The rotor according to claim 1, wherein the at least one upper contact part and the at least one upper adjusting element are configured so that at least one upper punch is always brought into contact by the at least one upper contact part.

10. The rotor according to claim 1, wherein the at least one upper adjusting element comprises at least one upper adjusting drive acting on the at least one upper contact part and in that the at least one lower adjusting element comprises at least one lower adjusting drive acting on the at least one lower contact part.

11. The rotor according to claim 10, wherein at least one of the at least one upper adjusting drive and the at least one lower adjusting drive is an pneumatic drive.

12. The rotor according to claim 10, wherein the at least one upper adjusting drive is an electrical upper adjusting drive.

13. The rotor according to claim 1 wherein at least one of the at least one upper contact part and the at least one lower contact part comprise at least one contact portion soaked in lubricant.

14. A rotary press comprising:
a rotor, the rotor further comprising a die plate having die bores, upper punches and lower punches assigned in pairs to the die bores, wherein the upper and lower punches configured to circulate synchronously with the die plate;
a drive configured to rotationally drive the rotor;
an upper punch receiver configured to guide the upper punches;
a lower punch receiver configured to guide the lower punches;
an upper control cam configured to control axial movement of the upper punches passing through the upper control cam;
a lower control cam configured to control axial movement of the lower punches passing through the lower control cam;
at least one upper contact part in contact with at least a portion of the upper punches passing through;
at least one lower contact part in contact with at least a portion of the lower punches passing through;
at least one upper adjusting element configured to adjust a position of the at least one upper contact part by altering a distance from the upper punches passing through, wherein the at least one upper contact part is always pressed with a substantially constant force onto the upper punches passing through;

at least one lower adjusting element configured to adjust a position of the at least one lower contact part by altering a distance from the lower punches passing through, wherein the at least one lower contact part is always pressed with a substantially constant force against the lower punches passing through;

at least one filling station, the at least one filling station comprising at least one filling device for filling the die bores with material to be compressed;

at least one pressing station located downstream of the at least one filling station and comprising at least one pressing device which presses the upper punches and lower punches into the die bores when passing through the at least one pressing station; and at least one ejection station located downstream of the pressing station in a rotational direction of the rotor and comprising an ejection device for ejecting tablets pressed into the die bores.

\* \* \* \* \*